United States Patent [19]

Jackson

[11] Patent Number: 4,545,287

[45] Date of Patent: Oct. 8, 1985

[54] METERED LOCKOUT VALVE

[75] Inventor: Alan D. Jackson, Hutchinson, Kans.

[73] Assignee: The Cessna Aircraft Company, Wichita, Kans.

[21] Appl. No.: 436,143

[22] Filed: Oct. 22, 1982

[51] Int. Cl.⁴ .................... F15B 11/08; F15B 13/042
[52] U.S. Cl. ........................................ 91/420; 91/445
[58] Field of Search ................. 91/420, 445; 137/522, 137/523, 106; 251/24, 282, 333, 63.4; 60/460

[56] References Cited

U.S. PATENT DOCUMENTS

| | | | |
|---|---|---|---|
| 3,049,101 | 8/1962 | Ruhl | 91/420 |
| 3,217,740 | 11/1965 | Vick | 137/469 |
| 3,583,431 | 6/1971 | Diel | 137/474 |
| 3,596,566 | 8/1971 | Krehbiel et al. | 91/420 |
| 4,361,075 | 11/1982 | Block | 91/420 |

FOREIGN PATENT DOCUMENTS 623707  8/1961  Italy .................................. 251/333

*Primary Examiner*—Irwin C. Cohen
*Attorney, Agent, or Firm*—Edward L. Brown, Jr.

[57] ABSTRACT

A metering lockout check valve which lowers gravity loads without chatter. The poppet has a conical concave face which surrounds an annular seat and is shaped so that as the poppet opens, the effective closing force increases requiring higher pressures in the opposite motor port to open the poppet. Conversely an overrun condition is prevented since when the pressure drops in the pump pressure side of the circuit, the poppet will reduce its opening and provide a metering function.

3 Claims, 2 Drawing Figures

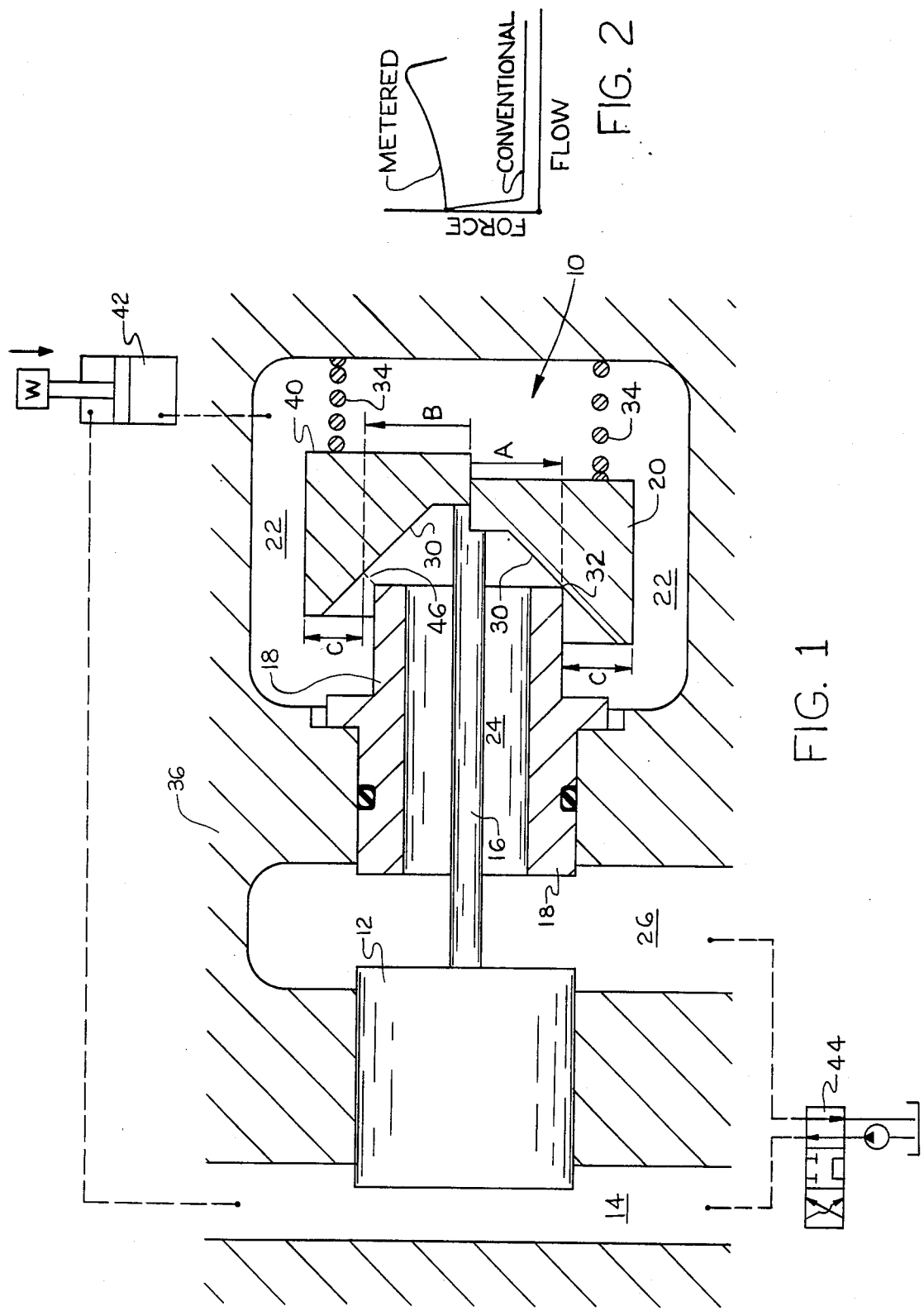

METERED LOCKOUT VALVE

BACKGROUND OF THE INVENTION

Hydraulic systems which lift heavy loads by spool type directional control valves have utilized an additional valve in the circuit commonly known in the trade as a "lock-out" valve which is positioned in the lines between the directional control valve and the working cylinder. The need for these additional lockout valves is caused by normal spool leakage in a directional control valve which if left in neutral would slowly allow the load to drop due to normal tolerance leakage across the spool lands of the control valve.

A lockout valve is a spring-closed check valve positioned in each motor port of the control valve which prevents any leakage from the cylinder to the valve until they are forced open by pressure from the pump source. The prior art lockout type control valves, such as shown in U.S. Pat. No. 3,596,566, depend on pressure fluid flowing from the pump source outward through one or the other motor ports of the valve to open both lockout check valves. In such a system when the piston rod of the controlled motor is subjected to a large external load, there is a great pressure variation in the fluid flow path in which each lockout check valve is interposed. As the piston rod is accelerated due to the external load, the cylinder begins to outrun the pump causing a drop in pressure in the pump supply path to one side of the cylinder. This lowers the pressure tending to hold the lockouts open and both lockouts momentarily spring-close. Their closing causes an instant stoppage of the cylinder piston and a resultant shock to the entire system. When fluid from the pump source again builds up sufficient pressure, both lockouts are reopened and the cycle is repeated. This phenomenon is known in the valve art as lockout chatter and regardless of efforts, the valve operator is incapable of accurately positioning the cylinder rod and its attached load or of accurately controlling the rate of movement of the load. All of this is due to the above-described instability of the lockout checks under heavy load.

Past efforts to overcome the lockout chatter problem, such as severely restricting the maximum return flow from the motor, have created a large operating efficiency loss which drastically limits the speed of movement and reaction time of cylinder movement on the machine.

One method of solving this chatter problem is illustrated in the above-mentioned patent wherein the timing of the control valve is changed so that the lockouts are fully open before there is any flow to or from the motor with the utilization of a separate pressure cavity to hold the lockouts open. This system requires a very complex valve coring and spool design to provide for all of the additional passages and valving functions. While the system does decrease the possibilities of chatter, it does not prevent the motor from overrunning the pump and cavitating the system.

DESCRIPTION OF THE PRESENT INVENTION

The present invention provides a lockout design which performs an additional function, namely metering the load, which has not been previously done in prior lockout valve designs.

In typical lockout valve designs such as the above-mentioned patent, the valve is either fully closed or fully opened. When a lockout is closed, the pressure of the motor load acts on the back side thereof until the pump pressure actuated servo overcomes that force and pushes the lockout check open. Once the load pressure on the back side is broken as the valve opens, the lockout snaps to the full open position with no intermediate positions. While these type of valves are only two-position, either closed or full open, the lockout check of the present invention functions in a different manner with an infinite number of metering positions depending upon the pressure level in the opposite motor port cavity of the valve. The lockout valve of the present invention has a similar plunger or servo for opening the lockout which senses pressure in the opposite motor port or pump discharge cavity of the valve. The poppet member of the lockout has a conical concave face which receives and surrounds an annular seat. In its closed position, the poppet member is exposed to return pressure from the motor load on both sides thereof with a decreasing area on the one side as the poppet opens. The net force effect to close the poppet increases as the poppet opens thereby providing an infinite number of metering positions.

It is therefore the principal object of the present invention to provide a hydraulic circuit including lockout valves which meter flow based on the pressure in the opposite motor port cavity.

It is another object of the present invention to provide a new and improved lockout valve which eliminates the problems of chatter and cavitation when moving heavy loads.

Other objects and advantages of the present invention will become more apparent to those skilled in the art from the detailed description which follows with references to the accompanying drawing wherein:

FIG. 1 is a longitudinal cross sectional view of the lockout check valve in abstract form with portions of the circuit shown schematically; and FIG. 2 is a force versus flow curve of the metering lockout check of the present invention compared with a conventional lockout check.

DESCRIPTION OF THE PREFERRED EMBODIMENT OF THE DRAWING

With reference to FIG. 1, the metering lockout check valve of the present invention, generally described by reference numeral 10, is located in a valve body 26. A conventional 4-way directional control valve 44 operates a double-acting cylinder 42 through lockout check valve 10. A second identical lockout could be located in the opposite motor port.

Lockout check 10 is pilot-operated by a plunger 12 which responds to pressure in cavity 14. Plunger 12 through pin 16, which contacts both plunger 12 and poppet 20, moves poppet 20 to the right off of seat member 18, allowing high pressure flow from motor port cavity 22 through axial passage 24 in seat member 18 to adjacent motor port cavity 26. Poppet 20 has a conical concave face 30 positioned at a 45° angle which surrounds and contacts seat member 18 forming an annular line contact seal 32. Poppet 20 is held against seat member 18 by a light spring 34, as shown in the bottom half of FIG. 1. FIG. 1 of the drawing illustrates the lower half of the poppet 20 in the closed position, and the upper half in a partially open position for purposes of illustration only. Radius A on the back side of the poppet 20 indicates the effective closing area which is urging the poppet closed while radius B indicates the effective closing area when the poppet is in an open position.

Lockout valves in general are positioned between the motor being operated and the directional control valve controlling the motor. In most applications, such as the above-mentioned patent, the lockout valve is actually located in the body of the directional control valve 36, as in the present invention. Cavity 14 is open to either a separate pump pressure cavity or the opposite motor port cavity, as illustrated in FIG. 1.

OPERATION

When directional control valve 44 is neutrally positioned, poppet 20 will be in its closed position, as illustrated by the bottom half of the poppet 20. With a heavy inertia load supported by motor 42, there will be substantial pressure in cavity 22 acting on both sides of poppet 20 with a net force attempting to close the poppet acting on the back side 40 over an area indicated by radius A.

When directional control valve 44 is shifted leftwardly to the position illustrated in the drawing, cavity 26 is open to drain while pump pressure is open to cavity 14 and in turn the rod end of cylinder 42. Lockout poppet 20 remains closed holding the load on motor 42 from movement until sufficient pressure builds in cavity 14 causing plunger 12 to force poppet 20 off its seat to an open position, as illustrated in the upper half of FIG. 1.

In analyzing the forces acting on poppet 20, there is the hydraulic force on the back side 40 of the poppet due to the load on motor 42 urging the poppet closed combined with a very light spring force from spring 34. The forces urging the poppet 20 open include; the force from plunger 12 and the hydraulic force acting on the partial frontal area of the poppet indicated by an annular area C. In viewing the two positions of poppet 20 in the bottom and top half of the drawing, it can be seen as the poppet 20 opens, the area C decreases which has a net effect on the poppet of increasing the force attempting to close the poppet the further the poppet opens. This is illustrated in the flow versus flow curve of FIG. 2. The further that poppet 20 opens, the smaller area C becomes and the amount of force required against plunger 12 increases.

METERING FUNCTION

With directional control valve 44 in its FIG. 1 position as pump pressure builds in cavity 14, the force on plunger 12 will gradually overcome the closing force on poppet 20 and force poppet 20 to a partially open position. The high pressure in motor port cavity 22 caused by the gravity load on cylinder 42 will meter across the throat of the check valve, as indicated by projection line 46 into reservoir via axial passage 24 and motor port cavity 26. Meanwhile as the load begins to move, the pump pressure in cavity 14 will flow into the rod end of cylinder 42. However, if the load begins to run away from the pump, pump pressure in cavity 14 will drop, which in turn causes a force reduction on plunger 12, and the poppet 20 will move leftwardly decreasing the flow across the lockout 10 until the forces on the poppet 20 stabilize. As poppet 20 moves towards a closed position, the effective closing force decreases until the forces match, and the poppet stabilizes. The poppet 20 thereby provides a metering function independent of any metering by directional control valve 44. If it is desirous to increase the speed at which cylinder 42 lowers its load, the directional control valve 44 must open sufficiently to increase the pump pressure level in cavity 14 causing poppet 20 to increase its opening and thereby increase the cylinder speed. Another factor which increases the closing force on poppet 20 as the poppet opens, in addition to the changes in area C previously mentioned, is the bernoulli effect across the conical face 30 upstream of the orifice due to the high velocity flow.

Having described the invention with sufficient clarity to enable those familiar with the art to construct and use it, I claim:

1. A metering lockout check valve in a hydraulic circuit including a pump supplying a double-acting motor through a directional control valve, the lockout valve being placed in the load pressure return circuit between the motor and directional control valve, the lockout valve which is normally closed is opened by a servo piston which senses pressure in the pump pressure side of the circuit, the lockout valve comprising:

a body having a central passage therein;

a movable poppet means positioned in said central passage having a concave conical face thereon;

said servo piston sensing pump discharge pressure and acting on the poppet means to open the poppet means;

a fixed seat member positioned in said central passage engageable by the conical face of the poppet to form an annular line contact seal, said seat member including a fluid passage means;

biasing means lightly urging the poppet means toward a closed position along with load pressure in the return circuit acting on both sides of the poppet means with an effective closing area being defined by the annular line seal;

the conical face of the poppet means is concave so that as the poppet opens, the effective closing area increases, thereby requiring higher pressures against the servo piston to further open the poppet whereby in an overrun condition when pressure drops in the pump pressure side of the circuit, the poppet means reduces its opening and provides a metering function.

2. A metering lockout check valve as set forth in claim 1, wherein said fluid passage means of the seat member is an axial passage therethrough.

3. A metering lockout check valve as set forth in claim 1, wherein the conical face is concave at an angle of approximately 45° to the axis of the poppet.

* * * * *